(12) United States Patent
Kitagaki

(10) Patent No.: US 8,615,034 B2
(45) Date of Patent: Dec. 24, 2013

(54) METHOD FOR ANALYZING RANDOM TELEGRAPH SIGNAL AND THRESHOLD LEVEL DETERMINATION METHOD THEREFOR

(75) Inventor: Takashi Kitagaki, Tokyo (JP)

(73) Assignee: Agilent Technologies, Inc., Santa Clara, CA (US)

( * ) Notice: Subject to any disclaimer, the term of this patent is extended or adjusted under 35 U.S.C. 154(b) by 1181 days.

(21) Appl. No.: 12/512,025

(22) Filed: Jul. 30, 2009

(65) Prior Publication Data

US 2010/0098143 A1    Apr. 22, 2010

Related U.S. Application Data

(60) Provisional application No. 61/106,608, filed on Oct. 19, 2008.

(51) Int. Cl.
*H04B 3/46* (2006.01)

(52) U.S. Cl.
USPC ........... 375/224; 382/172; 382/233; 382/239; 708/250

(58) Field of Classification Search
USPC ............ 375/224, 232; 382/172, 239; 708/250
See application file for complete search history.

(56) References Cited

U.S. PATENT DOCUMENTS

| | | | |
|---|---|---|---|
| 3,629,510 A * | 12/1971 | Anderson et al. | 704/208 |
| 7,366,234 B2 * | 4/2008 | Yamamoto et al. | 375/232 |
| 2003/0011837 A1 * | 1/2003 | Shake et al. | 359/110 |
| 2005/0125471 A1 * | 6/2005 | Sturm et al. | 708/250 |
| 2006/0291550 A1 * | 12/2006 | Wang et al. | 375/229 |

OTHER PUBLICATIONS

Y. Yuzhelevski, M. Yuzehlevski, and G. Jung, Random telegraph noise analysis in time domain, Review of Scientific Instruments, Apr. 2000, p. 1681-1688, vol. 71 No. 4, United States of America.

C. Leyris, F. Martinez, M. Valenza, A. Hoffmann, J.C. Vildeuil, and F. Roy, Impact of Random Telegraph Signal in CMOS Image Sensors for Low-Light Levels, 2006, p. 376-379, The IEEE Press Series.

* cited by examiner

*Primary Examiner* — Leon-Viet Nguyen

(57) ABSTRACT

A method for analyzing a random telegraph signal according to the present invention includes the steps of: performing band-pass filter processing with respect to signal data; subsequently calculating a histogram; subsequently performing threshold determination processing; further performing, based on a result of the threshold determination, binarization processing with respect to the filtered signal data; and further obtaining, based on a result of the binarization, coefficients τ.

20 Claims, 11 Drawing Sheets

METHOD FOR ANALYZING RANDOM TELEGRAPH SIGNAL AND THRESHOLD LEVEL DETERMINATION METHOD THEREFOR

BACKGROUND OF THE INVENTION

A random telegraph signal (RTS) is a signal which is observed, in a submicron MOS device, a Josephson device, a SQUID, a two-dimensional electron gas, a quantum dot, etc., as discrete values of physical quantities such as current and voltage, or as low-frequency noise which moves back and forth between levels. It should be noted that binary states have been mainly used for the discrete physical quantities observed in such a signal, and hence studies have been made mainly for the case of the binary states.

The existence of the RTS has been known since a long time ago (since the 1980s), but because of its relatively small power with respect to the main signal, the RTS has rarely been perceived as a problem in terms of operating a device. However, in recent years, due to the fact that devices have become smaller in size, requiring smaller actuating signals, the problems caused by the RTS are beginning to become actual.

For example, in Leyris, C.; Martinez, F.; Valenza, M.; Hoffmann, A.; Vildeuil, J. C.; Roy, F.; "Impact of Random Telegraph Signal in CMOS Image Sensors for Low-Light Levels"; Solid-State Circuits Conference, 2006; ESSCIRC 2006; Proceedings of the 32nd European Sept. 2006; pp.376-379, it is reported that the RTS causes degradation in image quality in a high-resolution CMOS image sensor, that is, an image sensor in which transistors forming pixels are small in size. Apart from the image sensor, microdevices having process sizes of 45 nm or smaller are said to have a risk of increased jitter or, at worst, malfunctions, due to the influence of the RTS. Accordingly, it is believed that the need to develop technology for suppressing the occurrence of the RTS or technology for avoiding the influence thereof has become urgent.

Meanwhile, there are various theories on the cause of the RTS, and there has been no consensus attained so far. According to the most widely accepted theory, for example, in a case of a MOS transistor, the RTS results related to an electron or hole trap caused by a crystal defect in the vicinity of the interface between the semiconductor and the insulating film, that is, oxide film, or within the insulating film. The RTS is consistent with the Poisson distribution ($p(t)=(\exp(-t/\tau))/\tau$), and the frequency spectrum thereof exhibits a Lorentzian distribution having a gradient of $1/f^2$. Specific parameters or time constants, that is, coefficients $\tau$ can be obtained using a gradient obtained through logarithmic plotting of the frequency or a histogram. It is believed that identifying the energy level or the distance from the interface of a trap causing the RTS would be of great use in studying the mechanism of RTS occurrence and the method of reducing traps. The energy level of a trap can be obtained using Arrhenius plots of the parameters or the time constants, that is, the coefficients $\tau$, which are dependent on the time lengths during which the RTS stays at the two levels. The distance from the interface can be obtained by the ratio between the coefficients $\tau$ at the two levels. There is a possibility that further information can be obtained through detailed analyses of the parameters in the future.

For example, as illustrated in FIG. 10, when it is easy, from the observed waveform, to discriminate between the two levels exhibited in the RTS, in the same manner as for a normal binary digital signal, one threshold, that is, a threshold level TH1 is set, whereby the coefficient $\tau$ can be easily obtained based on the duration of each of the two levels. However, as illustrated in FIG. 11, when such an RTS containing various noise as is observed in a microfabricated device is observed, it is difficult, with the discrimination method using a single threshold level TH1 according to the conventional method, to appropriately discriminate between the two levels exhibited in the RTS, resulting in difficulties in the analysis.

Meanwhile, in recent years, the reduction of the development period for a semiconductor process or device has been demanded, and hence it has become necessary to perform the RTS analysis for a large amount of devices produced under a variety of manufacturing conditions. Accordingly, it is required that the parameter extraction for the RTS be performed efficiently and at high speed.

It should be noted that the analysis method for a random telegraph signal which contains noise is discussed in Y. Yuzhelevski, M. Yuzhelevski, and G. Jung, "Random telegraph noise analysis in time domain", Rev. Sci. Instrum. 71, p.1681 (2000), but as indicated by $U^*_{up}$, $U^*_{dn}$ of FIG. 5, due to the fact that a threshold which does not change in level across the entire section is conceived, the application to the analysis of an RTS containing large noise as illustrated in FIG. 11 is impossible.

SUMMARY

An object of the present invention is to solve the above-mentioned problems to thereby provide a method for analyzing an RTS which contains noise.

Another object of the present invention is to provide an RTS analysis method in which, from an RTS which contains noise and exhibits binary state levels, a threshold for making a judgment on the binary state levels is obtained.

Still another object of the present invention is to provide a threshold determination method for an RTS, in which a threshold for the RTS which contains noise and exhibits binary state levels is obtained as a result of combining thresholds for a plurality of sections.

Still another object of the present invention is to provide an RTS analysis method in which an RTS which contains noise and exhibits binary state levels is analyzed, and then coefficients $\tau$ are obtained.

Still another object of the present invention is to provide a method for analyzing an RTS which contains noise and exhibits its ternary or higher state levels.

According to the present invention, a method for analyzing a random telegraph signal includes the steps of: performing band-pass filter processing with respect to signal data to remove low-frequency noise and high-frequency noise in advance; calculating a histogram of the filtered signal data; performing threshold determination processing with respect to the filtered signal data; performing, based on a result of the threshold determination, binarization processing with respect to the filtered signal data; and obtaining, based on a result of the binarization, coefficients $\tau$.

Further, according to the present invention, the method for analyzing a random telegraph signal also includes: an aspect of calculating, prior to the step of the band-pass filter processing, a frequency spectrum of the signal data; an aspect in which the step of the band-pass filter processing includes allowing a signal within a frequency range which includes a frequency at an inflection point of the frequency spectrum of the signal data to pass; an aspect in which the step of the threshold determination processing includes determining, based on a result of the calculating the histogram, central values of respective levels of two states of the RTS and effective ranges for the respective levels indicating the two states;

an aspect in which the step of the threshold determination processing further includes obtaining an average of the central values of the two states; an aspect in which the step of the threshold determination processing includes dividing the signal data into a plurality of sections and determining a threshold for each of the plurality of sections; an aspect in which the determining the threshold for each of the plurality of sections includes a step of adjusting a section length of each section; an aspect in which the step of the threshold determination processing includes calculating an effective ratio which indicates how much signal data of a section having a given section length is included in the effective ranges of the two states of the RTS to thereby perform the threshold determination by shortening the section length when the effective ratio is below a predetermined range, and by extending the section length when the effective ratio is above the predetermined range; and an aspect in which the step of obtaining the coefficients τ is performed by applying, based on a result of the binarization processing, a maximum likelihood method to distributions of pulse widths for respective levels.

According to the present invention, a threshold determination method for a random telegraph signal includes the steps of: calculating a histogram with respect to data; performing threshold determination processing with respect to the data; and performing, based on a result of the threshold determination, binarization processing with respect to the data. This threshold determination method also includes: an aspect of dividing the data into a plurality of sections and determining a threshold for each of the plurality of sections; an aspect in which the determining the threshold for each of the plurality of sections includes a step of adjusting a section length of each section; and an aspect of obtaining effective ranges of levels indicating two states of the RTS based on a result of the calculating the histogram to calculate an effective ratio which indicates how much signal data is included in the effective ranges for each of the plurality of sections, and performing the threshold determination by shortening a section length of the each of the plurality of sections when the effective ratio is below a predetermined range, and by extending the section length when the effective ratio is above the predetermined range.

According to the present invention, another method for analyzing a random telegraph signal includes the steps of: calculating a moving average of signal data; performing, with a result of the calculating as a threshold, binarization processing with respect to the signal data; and obtaining coefficients τ based on a result of the binarization processing.

According to the present invention, yet another method for analyzing a random telegraph signal includes the steps of: performing differentiation processing with respect to signal data; calculating a histogram of a result of the differentiation; performing, based on a result of the calculating the histogram, ternarization processing with respect to the result of the differentiation by focusing on a distribution of differential values, which indicates characteristics of jumps of the RTS; performing integration processing with respect to a result of the ternarization processing to obtain binarized data in terms of actual time; and obtaining coefficients τ based on the binarized data obtained by the integration processing.

This method for analyzing a random telegraph signal includes an aspect in which: the step of the ternarization processing includes assigning "1" and "−1" to differential values indicating jumps upward and jumps downward of the RTS, respectively, and assigning "0" to differential values indicating other variation amounts; and the ternarization processing further includes processing "1" that comes after "1" and "−1" that comes after "−1" as "0".

According to the present invention, yet another method for analyzing a random telegraph signal includes the steps of: performing band-pass filter processing with respect to signal data to remove low-frequency noise and high-frequency noise in advance; calculating a histogram of the filtered signal data; judging, based on a result of the calculating the histogram, whether or not the signal data includes an RTS which contains discrete values of ternary states or higher; and repeating, when the signal data is the RTS which contains the state levels of ternary states or higher: selecting, based on the result of the calculating the histogram, a combination of binary states; performing threshold determination processing with respect to the filtered signal data by focusing on the selected binary states; performing binarization processing with respect to the filtered signal data; and obtaining coefficients τ.

This method for analyzing a random telegraph signal also includes: an aspect in which, when the signal data includes an RTS which contains quaternary state levels, the step of obtaining the coefficients τ includes: selecting, upon selecting the combination of binary states based on the result of the calculating the histogram, binary states of any one of a pair of higher peaks and a pair of lower peaks; subsequently calculating a distance between each of the higher peaks and each of the lower peaks; identifying two pairs of the higher peak and the lower peak, which have a common distance on x axis; and selecting binary states of any one of the pairs of peaks; and an aspect in which, when the signal data is an RTS which contains ternary state levels, the step of obtaining the coefficients τ includes: identifying, upon selecting the combination of binary states based on the result of the calculating the histogram, a peak which is a result of combining a higher peak and a lower peak based on a peak height of each state level to thereby divide that peak into the higher peak and the lower peak; subsequently selecting binary states of any one of a pair of higher peaks and a pair of lower peaks; subsequently calculating a distance between each of the higher peaks and each of the lower peaks; identifying two pairs of the higher peak and the lower peak, which have a common distance; and selecting binary states of any one of the pairs of peaks.

BRIEF DESCRIPTION OF THE DRAWINGS

Further preferred features of the invention will now be described for the sake of example only with reference to the following figures, in which.

DETAILED DESCRIPTION

First, an analysis method for an RTS which exhibits binary discrete values is described. It should be noted that the analysis method for an RTS described herein is not limited to an RTS obtained by current measurement of a device, but may be applicable to any signal which is observed as voltage such as a threshold voltage of a device or as another physical quantity thereof, and exhibits a characteristic of the RTS, that is, a transition or a jump between a plurality of state levels.

With reference to FIGS. 1 to 5, as a first embodiment of the present invention, a description is made of the analysis method for an RTS which exhibits binary discrete values.

Figure 1:
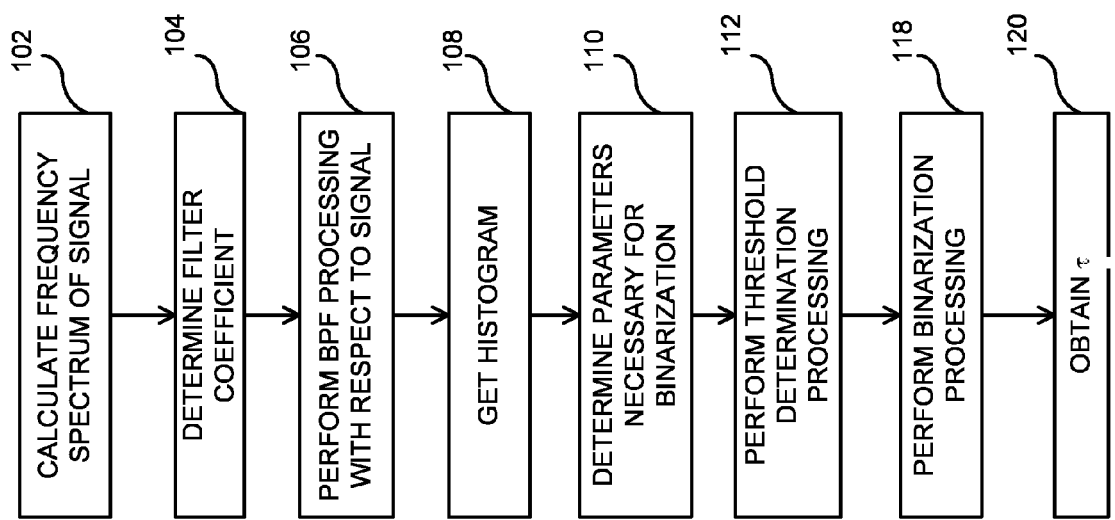
FIG. 1 is a flow chart of an RTS analysis method according to a first embodiment which is a preferred embodiment of the present invention.
Figures 3A, 3B:
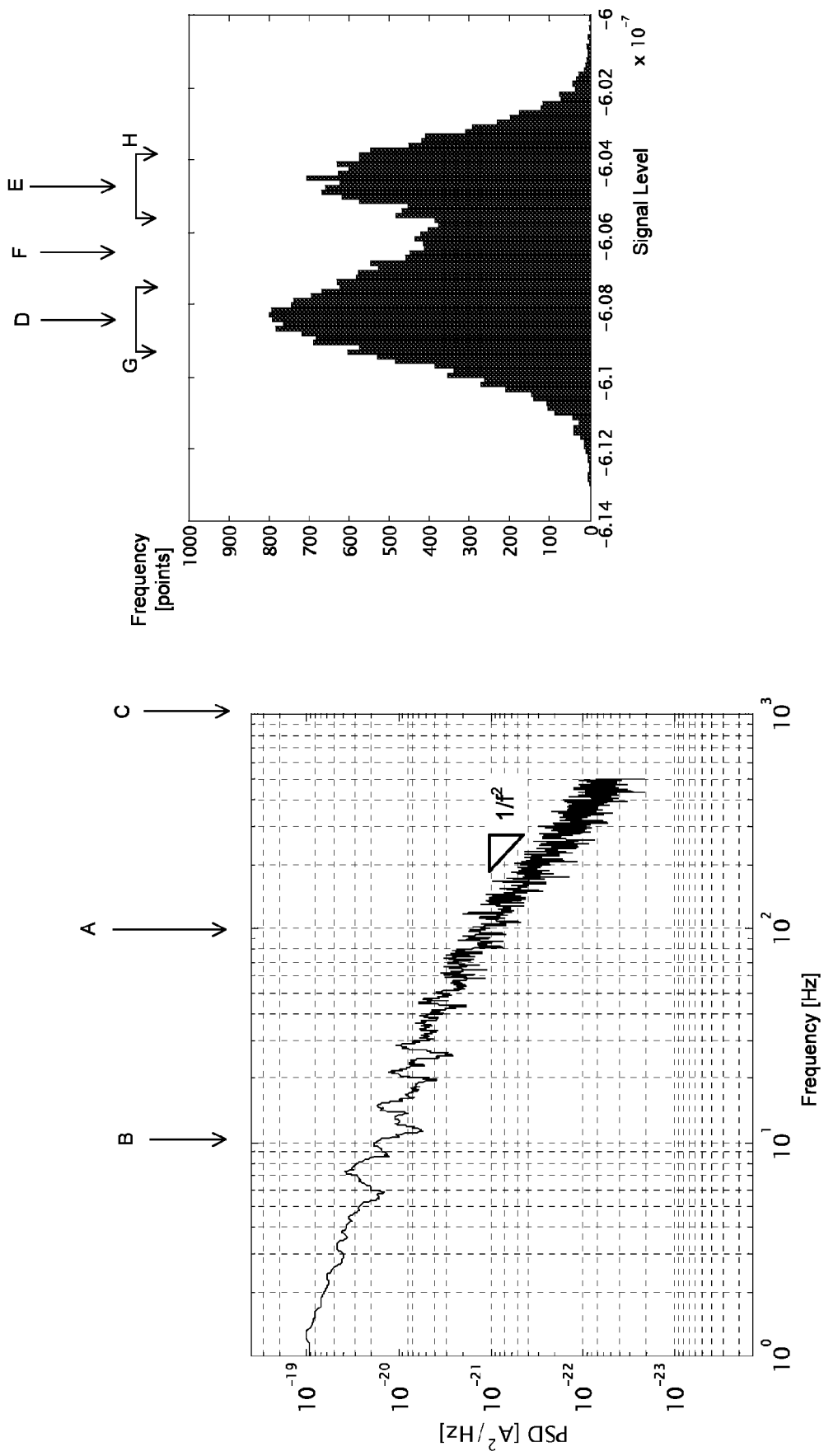
FIG. 3A is a graph illustrating an example of a calculation result of Step 102 of FIG. 1.
FIG. 3B is a graph illustrating an example of a calculation result of Step 108 of FIG. 1.

First, FIG. 1 illustrates a flow chart for the analysis method according to this embodiment. According to the first embodiment of the present invention, with respect to signal data having a characteristic of the RTS, a frequency spectrum is calculated (Step 102). Next, based on the obtained frequency spectrum, parameters or coefficients of a filter, which are used for performing band-pass filter (BPF) processing with respect to this signal data, are determined (Step 104). The parameters are, for example, a lower limit frequency and an upper limit frequency of a band which is to be allowed to pass in the BPF processing. FIG. 3A illustrates an example of the frequency spectrum of the RTS data obtained in Step 102. In FIG. 3A, with the vicinity of a frequency of 100 Hz indicated with A set as a bound, it is judged that, at higher frequencies than that, the RTS having a gradient of $1/f^2$ is observed. In Step 104, by using such a method that obtains an average of gradient for each section of the frequency spectrum, a portion having the gradient of $1/f^2$ which indicates the RTS is identified. Further, a frequency A which is an inflection point between that portion and a portion of lower frequencies adjacent thereto is identified, and then, the parameters for the BPF are determined in such a manner as to allow signals having a predetermined range of frequencies including that frequency to pass. To give an example, as the frequency range for the signals which are allowed to pass through the BPF, there is used a frequency range of two decades, and in the example of FIG. 3A, a frequency range specified as being from a frequency B to a frequency C represents a band which can pass through the above-mentioned BPF. As described above, the frequency spectrum is calculated from the signal data, and then, based on that, the signals within the band, which have a characteristic necessary for the RTS analysis, are obtained using the BPF processing. With such processing as described in Steps 102 to 106, waving noise at lower frequencies and ripple noise at higher frequencies are removed.

Next, a histogram is calculated with respect to the above-mentioned filtered signal data (Step 108). Based on the characteristic of the histogram, RTS characteristics with respect to the whole of the filtered signal data, that is, parameters necessary for binarization of the signal data, are determined (Step 110). As the parameters, for example, the followings are obtained and determined: a peak central value of each state level of the Gaussian distribution, each state level being a level in which values representing physical quantities of the RTS such as current and voltage are larger (On state) or a level in which such values are smaller (Off state), and a variance $\sigma^2$ for each state level; a signal level range which can be recognized as each state level, that is, an effective range of each state level; and an average of the peak central values of both the state levels, that is, a threshold. Here, as the signal level range (effective range) recognizable as indicating each state level, for example, there is used a predetermined range, which is defined assuming that each state level exhibits a histogram consistent with the Gaussian distribution, such as a range which is defined with the peak of the Gaussian distribution at the center and a width $\sigma$. It should be noted that a signal level of each of the On state and the Off state of the RTS is simply referred to as a first state level and a second state level, respectively.

FIG. 3B illustrates an example of the histogram. The signal levels indicated by symbols D and E of FIG. 3B represent the central values of the first state level and the second state level, respectively. Ranges G and H represent the effective ranges of the first state level and the second state level, respectively. Symbol F represents an average signal level of D and E, that is, the threshold in this case. Ideally, the histogram should not have deviations, but in reality, as illustrated in FIG. 3B, deviations are observed. This is mainly caused by the influence from waving noise of low frequencies, and the influences from noise of high frequencies and from the sampling timing of the RTS also have some affects.

Figure 2:
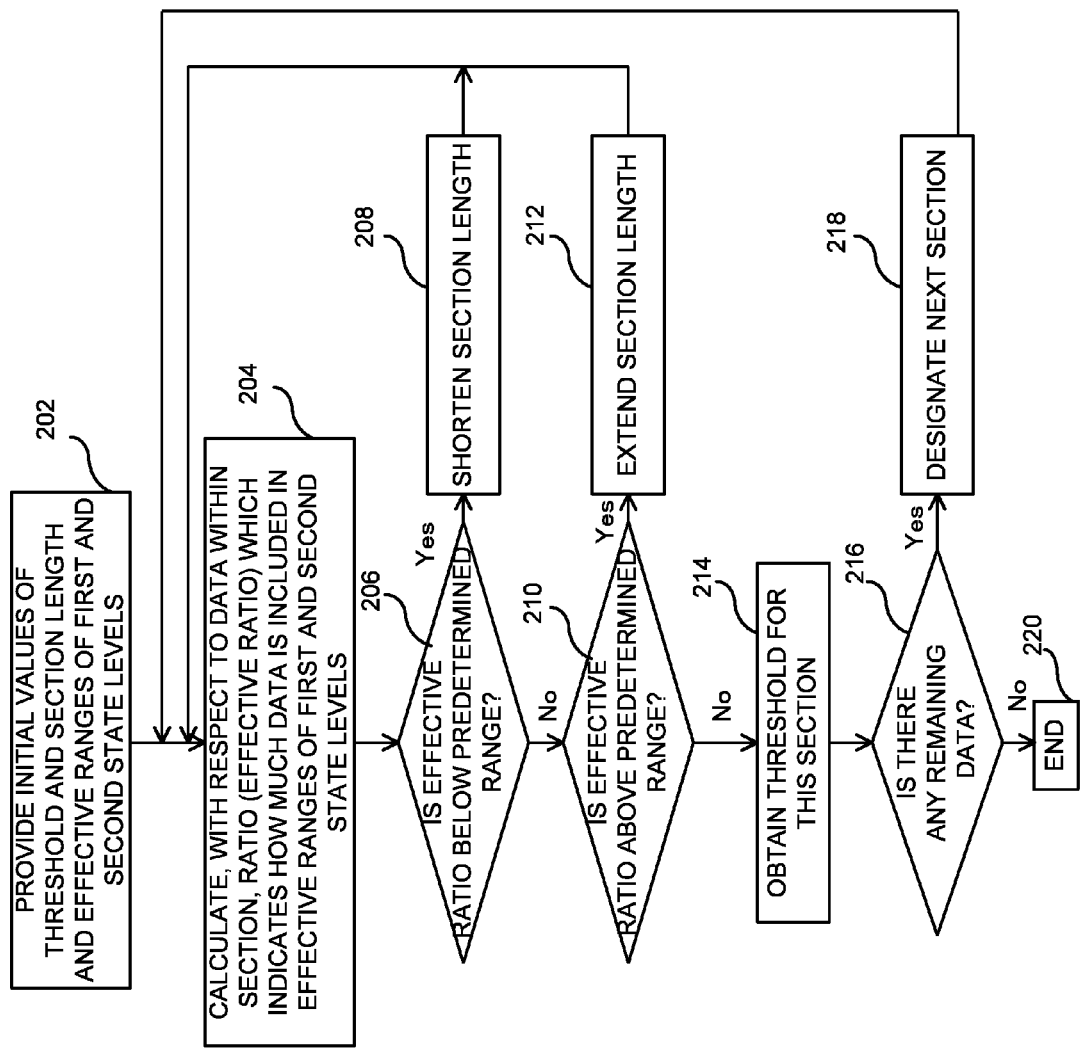
FIG. 2 is a flow chart for describing in detail Step 112 of FIG. 1.

Next, in Step 112, processing of determining the threshold is performed. Here, the filtered signal data is divided into a plurality of sections, and then, processing of determining a threshold for each section is performed. With regard to Step 112, a detailed description is illustrated in FIG. 2. First, at the beginning of the threshold determination processing, an initial value of the threshold, an initial value of a section length, and effective ranges of the first and second state levels are provided as initial parameters (Step 202). Here, as one example of the initial value of the threshold, the threshold obtained in Step 110 with respect to the entire signal data (entire section) may be used. The initial value of the section length may be a predetermined value, and for example, a length having a predetermined ratio to the entire section may be used.

Next, with respect to the first section of the signal data after the filter processing, a ratio indicating how much data within the section is included in the effective ranges of the first and second state levels, that is, an effective ratio is calculated (Step 204). Then, it is judged whether or not the effective ratio is below a predetermined range (Step 206). When the effective ratio is below the predetermined range, the section length is shortened by a predetermined width (Step 208), and the processing from Step 204 is repeated. On the other hand, when it is judged that the effective ratio is not below the predetermined range in Step 206 but above the predetermined range (Step 210), the section length is extended by a predetermined width (Step 212), and the processing from Step 204 is repeated. Through the above-mentioned steps, the length of the section starting from the starting point of this section is eventually determined so that the effective ratio of the data within this section falls within the predetermined range. Next, based on the data included in the effective range among the data within this section, the threshold of this section is obtained (Step 214). The determination of this threshold can be performed by recalculating a histogram from the data within this section and averaging, similarly to Step 110, the central values of the both state levels. Alternatively, if Step 204 is so configured that a histogram is calculated on every occasion, the threshold can be obtained using a part of the calculation result of Step 204. It should be noted that one example of the predetermined range for the effective ratios of Step 206 and Step 210 is 70% to 80%.

In other words, the above-mentioned operation from Steps 204 to 214 may be considered as such operation as follows. As described above, the observed data is affected mainly by the influence from the waving noise of low frequencies. Shortening the section length means shortening the time length during which the influence from noise is received, which therefore produces an effect of eliminating the influence from the noise. However, if the section length is shortened too much, the time length for judgment of the RTS is increased, and in an extreme case, the RTS, which is originally supposed to be obtained, is also eliminated. Extending the section length means extending the time length during which the influence of noise on the RTS is received, but by setting the section length to an extent that does not cause erroneous judgment, an effect of shortening the time length for judgment of the RTS can be obtained.

In other words, this can be understood as such operation in which, while allowing the presence of data with levels out of the effective ranges, the section length is so selected that the presence of such data falls within an appropriate range, and then, by obtaining the threshold for that section with respect to the data within the section thus determined, the threshold having a certain degree of significance is efficiently obtained.

Next, in Step 216, it is judged whether or not there is any remaining data, for which the threshold has not been determined yet. When there is any remaining data, the next section is designated (Step 218), and the processing from Step 204 is repeated. When there is no remaining data in Step 216, this processing is ended (Step 220), and the processing proceeds to Step 118 of FIG. 1.

In Step 118 of FIG. 1, by using the threshold for each section obtained in Step 112, binarization (or digitalization) processing is performed with respect to the filtered signal data.

Figure 4A:
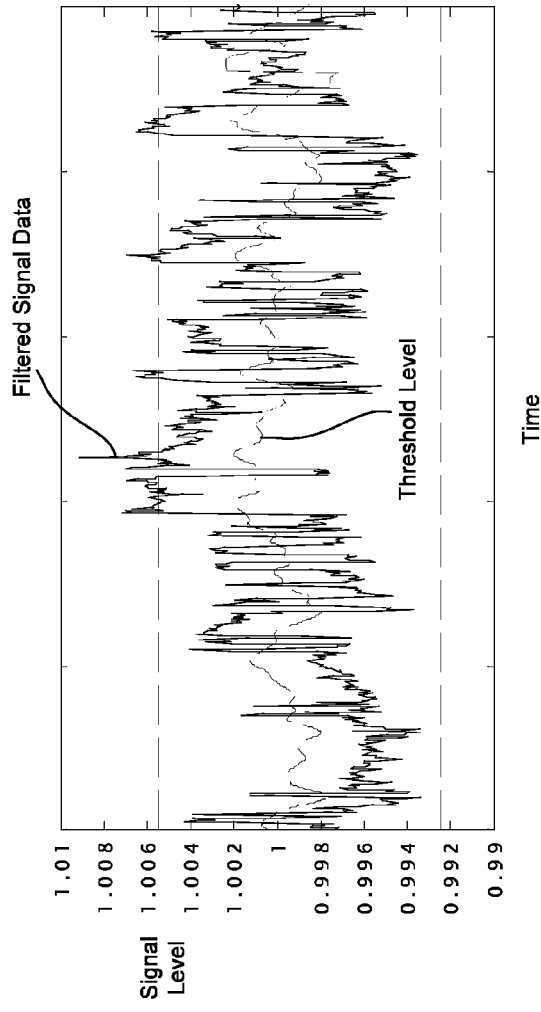
FIG. 4A is a graph illustrating an example of a calculation result of Step 112 of FIG. 1.
Figure 4B:
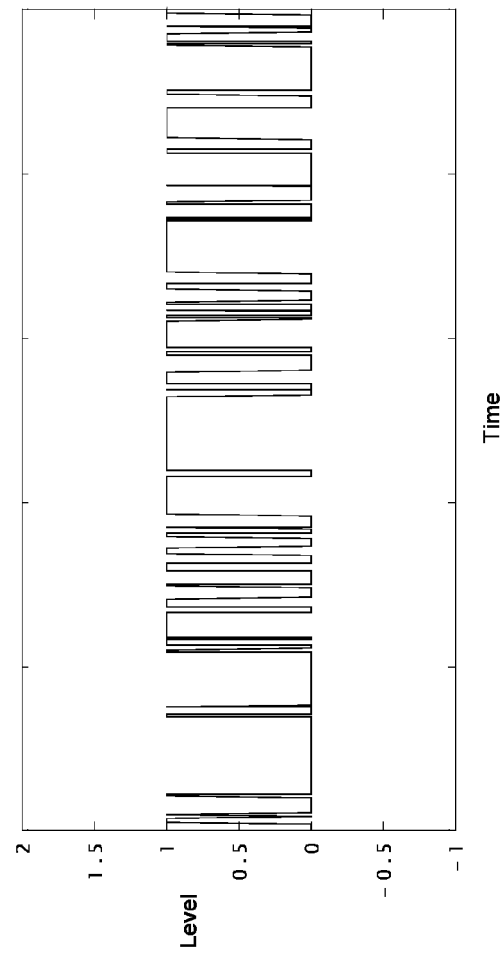
FIG. 4B is a graph illustrating an example of a calculation result of Step 118 of FIG. 1.

FIG. 4A illustrates a graph of the filtered signal data and the thresholds obtained in Step 112. FIG. 4B illustrates a graph of the result of the binarization based on FIG. 4A.

Figure 5:
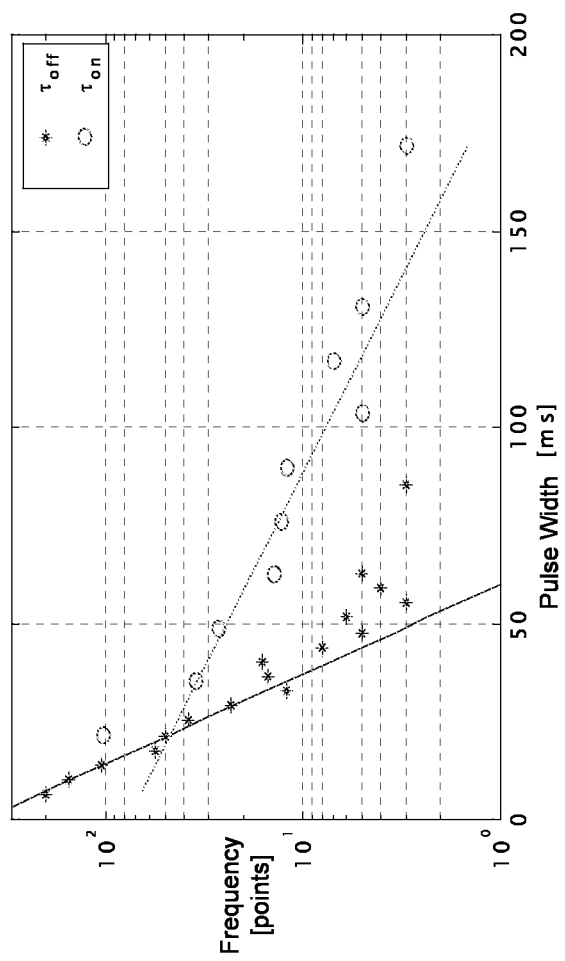
FIG. 5 is a graph illustrating an example of a calculation result of Step 120 of FIG. 1.

In the last step of the first embodiment, based on the result of the binarization performed in Step 118, the distribution of pulse widths is plotted into a logarithmic graph for each of the first state level and the second state level, and then, based on the gradient of each state level, a coefficient $\tau$ is obtained using a maximum likelihood method or a maximum likelihood estimation method (Step 120). In FIG. 5, the coefficients $\tau$ obtained in Step 120 for the first state level and the second state level are illustrated as the distributions of $\tau$ of the On state and $\tau$ of the Off state, that is, $\tau_{on}$ and $\tau_{off}$.

As described above, according to the first embodiment of the present invention, the signal data is divided into a plurality of sections, and for each of the sections, the threshold is determined with taking into account statistical distribution parameters. By combining the thresholds for the respective sections, a threshold curve or a threshold time transient across all the sections is obtained, and hence an appropriate threshold can be determined even for the RTS having large noise. Further, it should be noted that, in this embodiment, an appropriate threshold is obtained by adjusting the section length of each section when the threshold is determined.

Figure 6:
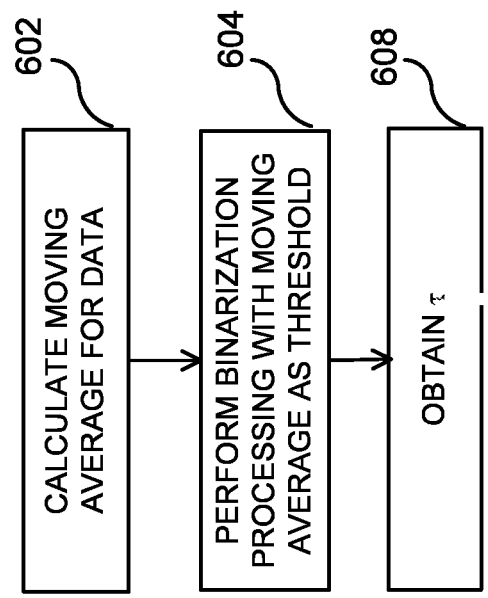
FIG. 6 is a flow chart illustrating a second embodiment according to the present invention.

Next, as a second embodiment of the present invention, another analysis method for an RTS exhibiting binary discrete values is described with reference to a flow chart of FIG. 6.

In the second embodiment, first, with respect to signal data exhibiting a characteristic of the RTS, a moving average is calculated (Step 602). Next, with the moving average as a threshold, binarization processing is performed with respect to the signal data (Step 602), and based on the result of the binarization processing, coefficients $\tau$ are obtained (Step 608). In Step 608, the same processing as in Step 120 of FIG. 1 is performed.

Here, the moving average calculation, which is smoothing processing, has the effect of a low-pass filter, and therefore has an effect of suppressing noise of high frequencies. Compared with the first embodiment, the amount of calculation is smaller, and hence this embodiment is suitable for a case in which less noise is included at low frequency and a high-speed analysis is required.

Figure 7:
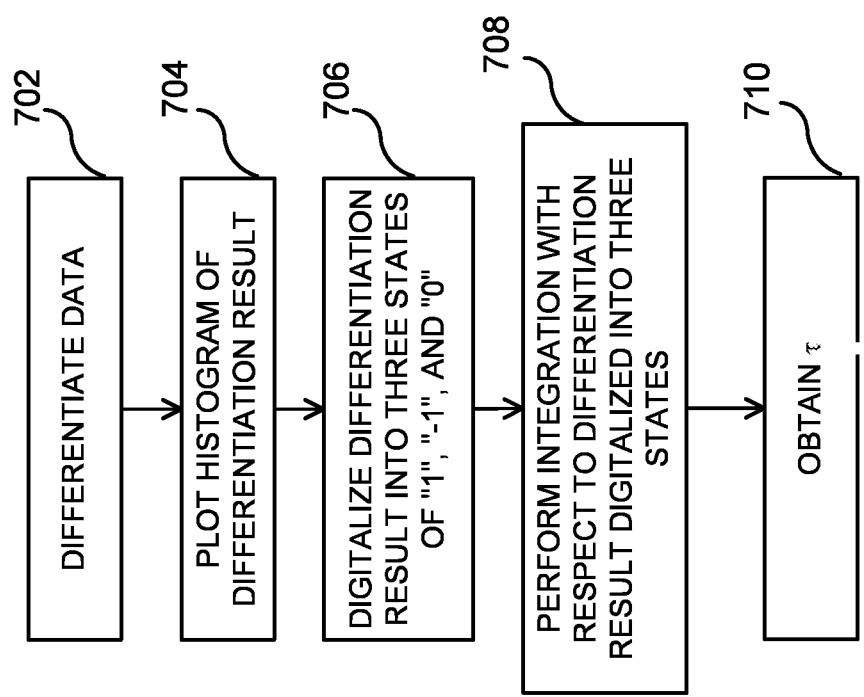
FIG. 7 is a flow chart illustrating a third embodiment according to the present invention.

Next, as a third embodiment of the present invention, yet another analysis method for an RTS exhibiting binary discrete values is described with reference to a flow chart of FIG. 7.

In the third embodiment, first, differentiation processing is performed with respect to signal data (Step 702). As the differentiation processing, for example, such a method that calculates differences between adjacent pieces of data is used. The differentiation processing is a high-pass filter processing, and hence, by performing this operation, noise of low frequencies is suppressed.

Next, a histogram for the differentiated result is calculated (Step 704). The distribution of this histogram has three peaks. One is a peak having a positive value which represents a jump upward of the RTS, whereas another one is a peak having a negative value which represents a jump downward of the RTS. The other one is a peak which shows an increase/decrease of a signal but has no relation with a jump between the states of the RTS, and has a smaller absolute value compared with the former two peaks.

Based on the distribution of the histogram for this differentiation result, a distribution of differential values representing characteristics of jumps of the RTS is extracted, and then, the differentiation result is subjected to digitalization into three states of "1", "−1", and "0" (Step 706). Specifically, differentiation results within a predetermined range related to the distribution of the differentiation result which represents jumps upward are assigned "1"; differentiation results within a predetermined range related to the distribution of the differentiation result which represents jumps downward are assigned "−1"; and differentiation results for other distribution ranges, that is, a distribution between the distributions representing jumps upward and downward, in which differences are small, and distributions in which differences are extremely large, are assigned "0", which indicates an invalid region. Here, on this occasion, as correction processing for ternarization processing, when "1" comes after "1", the second "1" is set to "0", whereas when "−1" comes after "−1", the second "−1" is set to "0" through correction or limiter processing. Here, with this ternarization processing, signals with such variation amounts that have no relation with jumps between the states of the RTS are removed. In other words, it should be noted that this ternarization processing serves not as a filter with respect to frequencies but as a filter with respect to the current/voltage quantity.

Next, the differentiation results after the ternarization are integrated (Step 708). With this, the signal data can be obtained as binarized data in terms of real time. Then, based on the binarized data, coefficients τ are obtained (Step 710). In Step 710, the same processing as in Step 120 of FIG. 1 is performed.

As described above, according to the third embodiment, noise of low frequencies is removed from the signal data through the differentiation processing. Then, current noise or voltage noise is removed through the ternarization processing based on the histogram for the differentiation result. By integrating the results thereof, signal extraction for the RTS can be performed.

Next, as a fourth embodiment of the present invention, an analysis method for an RTS including ternary or higher discrete values is described with reference to a flow chart of FIG. 8.

Figure 8:
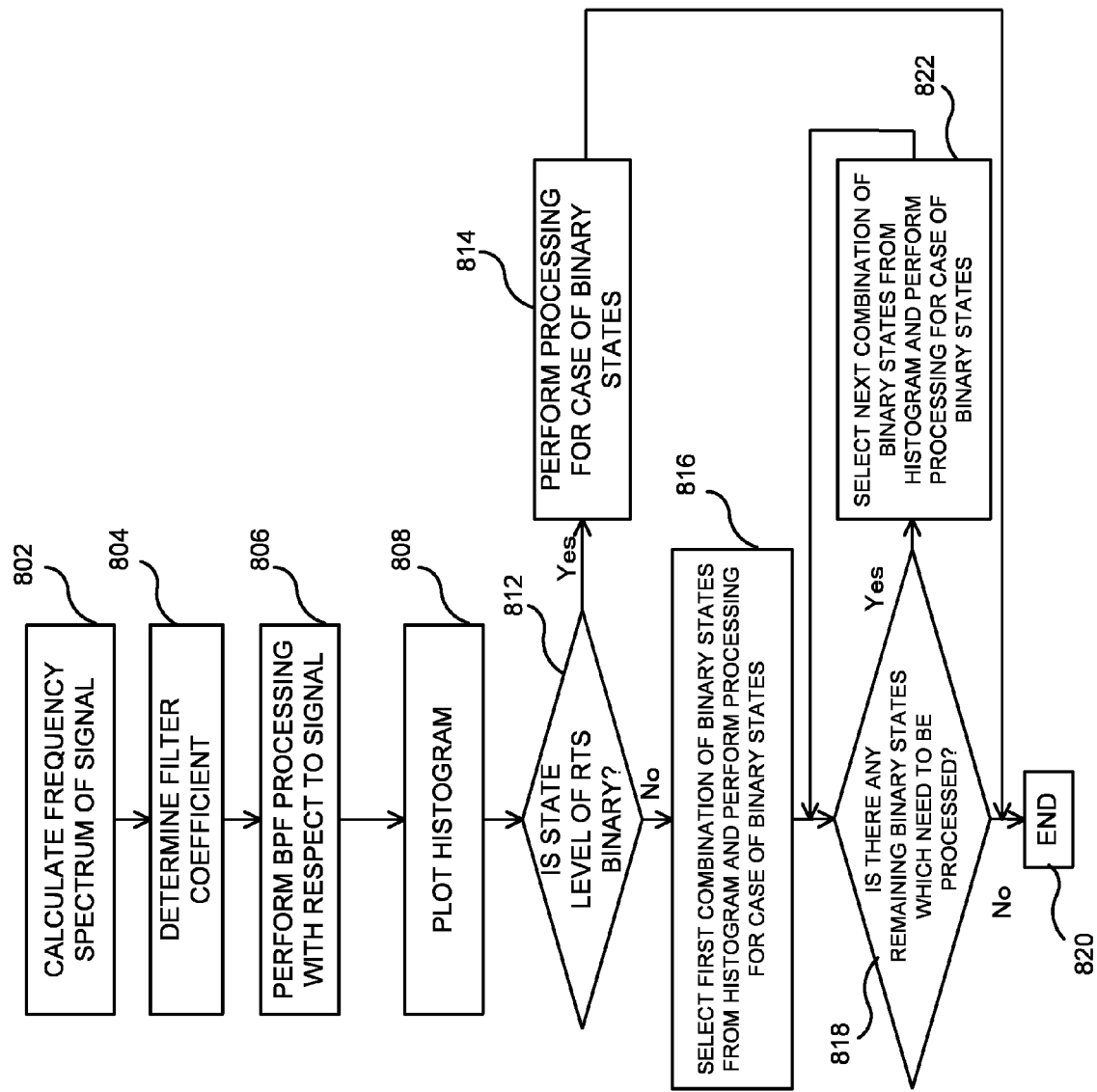
FIG. 8 is a flow chart illustrating a fourth embodiment according to the present invention.

In FIG. 8, Steps 802 to 808 are the same as Steps 102 to 108 of FIG. 1 according to the first embodiment. Specifically, a frequency spectrum of signal data is calculated (Step 802), a filter coefficient is determined (Step 804), band-pass filter processing is performed with respect to the signal data (Step 806), and a histogram is obtained with respect to the filtered signal (Step 808). Next, based on the number of peaks of the histogram, when the values of the RTS show binary states (Step 812), the processing proceeds to Step 814, and the processing for the binary states is performed. Specifically, the processing from Steps 110 to 120 of FIG. 1 is performed.

In Step 812, when three or more peaks appear in the histogram, the processing proceeds to Step 816. Then, based on the result of the histogram, a combination of two peaks which is to be analyzed first is selected, and coefficients τ are obtained by applying the processing for the case in which the peaks show binary states. Specifically, this is the same processing as the processing from Steps 110 to 120 of FIG. 1.

Next, when there is any remaining combination of peaks which needs to be processed (Step 818), based on the result of the histogram, a combination of two peaks which is to be analyzed next is selected, and coefficients τ are obtained by applying the processing for the case in which the peaks show binary states. Specifically, this is the same processing as the processing from Steps 110 to 120 of FIG. 1.

In this manner, when there is no combination of peaks left which needs to be processed, the processing is ended (Step 820).

With regard to the above-mentioned processing, in Steps 816 and 822, the processing may be performed for every combination of peaks which appear in the histogram, but it is efficient to select combinations which need to be processed in the following manner. First, as illustrated in FIG. 9A, such a case is examined in which a histogram has four peaks. In the case of four peaks, it is considered that those peaks are observed because there are two defects causing RTSs in a device, and each of the RTSs is separately captured and emitted. Further, when there are two peaks resulting from one defect, the higher peak and the lower peak make a pair in many cases. Based on this, in order to obtain coefficients τ for each of the two defects, first, it is judged which peaks make a pair of a higher peak and a lower peak based on the height of each peak and the distance between adjacent peaks. Specifically, to take FIG. 9A as an example, it is judged that, as pairs of the higher peak and the lower peak, there exist a pair Q and a pair X based on the height of each peak and the distance between adjacent peaks. Next, the following two peaks are selected, and then a series of processing for obtaining the coefficients τ is performed. Specifically, 1) the coefficients τ are obtained with respect to a pair of the two highest peaks (combination of peaks indicated by P of FIG. 9A) or a pair of the two lowest peaks (combination of peaks indicated by V of FIG. 9A). 2) Subsequently, the coefficients τ are obtained with respect to one of pairs of the higher peak and the lower peak described above (pair of peaks indicated by Q or X of FIG. 9A). It should be noted that the peaks indicated by P of FIG. 9A are both the higher peaks, and that the peaks indicated by V are both the lower peaks. Here, a method of identifying one of the pairs of the higher peak and the lower peak is as follows. First, of the higher peaks, the focus is directed toward the peak which is located at the end of the histogram. Then, distances between that peak and each of the lower peaks (first distance and second distance) are calculated, respectively. Further, distances between the other higher peak and each of the lower peaks (third distance and fourth distance) are calculated, respectively. Based on those four distances, two pairs of the higher peak and the lower peak, which have the same distance, that is, a common distance, can be judged.

Figure 9C:
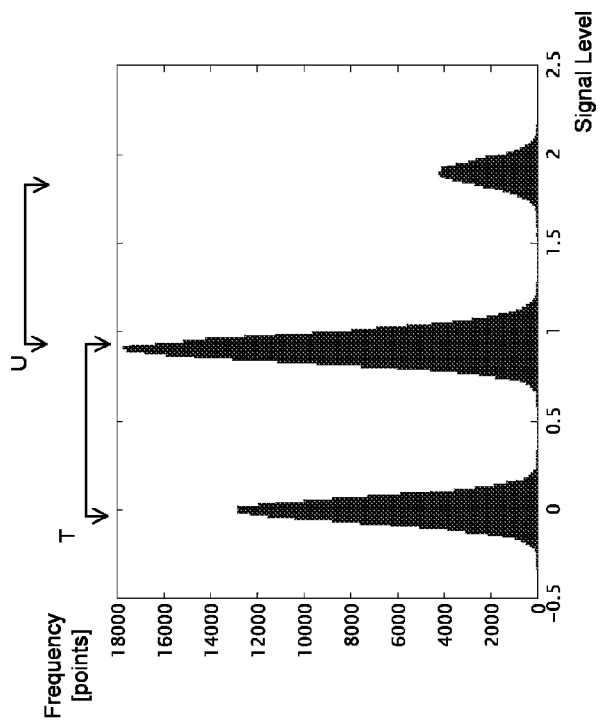
FIG. 9C is a diagram for describing, taking ternary peaks as an example, selection methods of Steps 816 and 822 of FIG. 8.
Figure 9A:
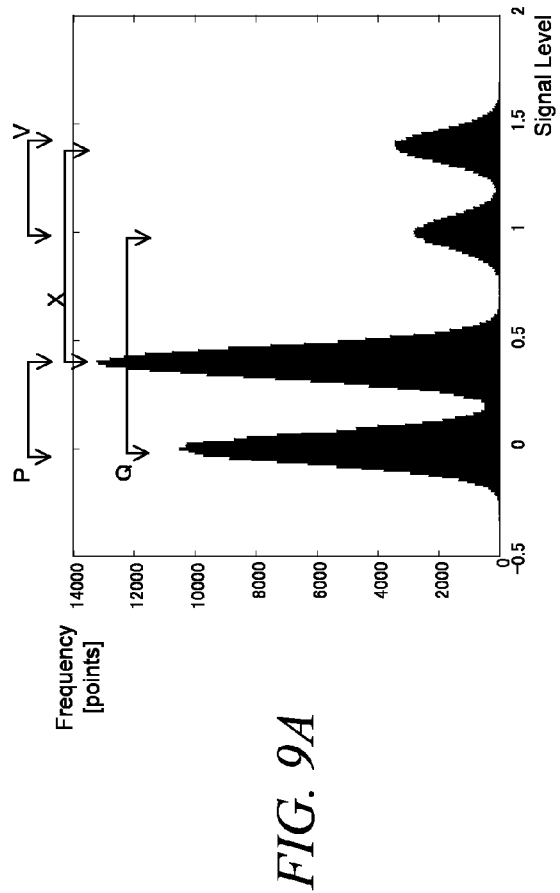
FIG. 9A is a diagram for describing, taking quaternary peaks as an example, selection methods of Steps 816 and 822 of FIG. 8.
Figure 9B:
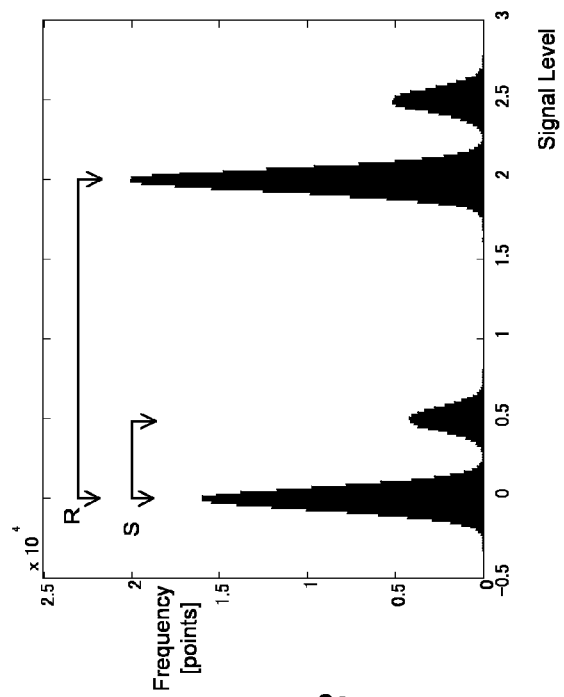
FIG. 9B is a diagram for describing, taking another quaternary peaks as an example, selection methods of Steps 816 and 822 of FIG. 8.
Figure 10:
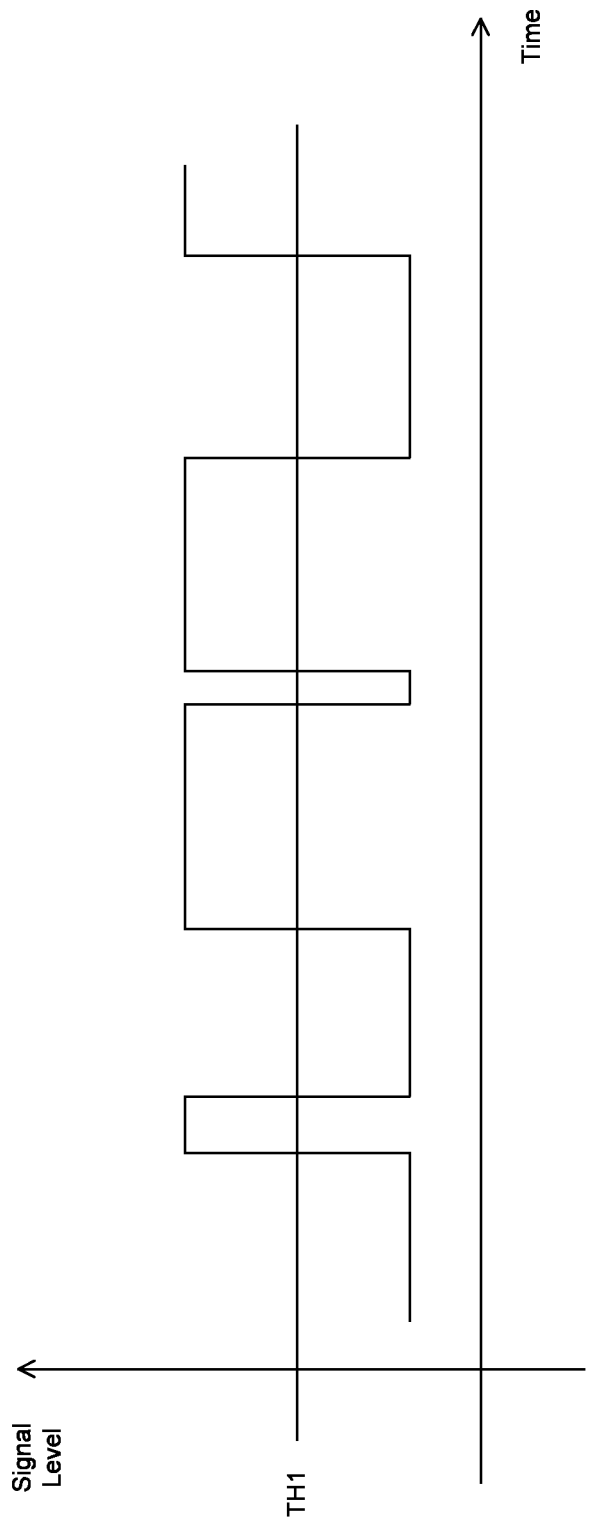
FIG. 10 is a graph illustrating an example of determining a threshold for an RTS containing no noise according to a conventional art.
Figure 11:
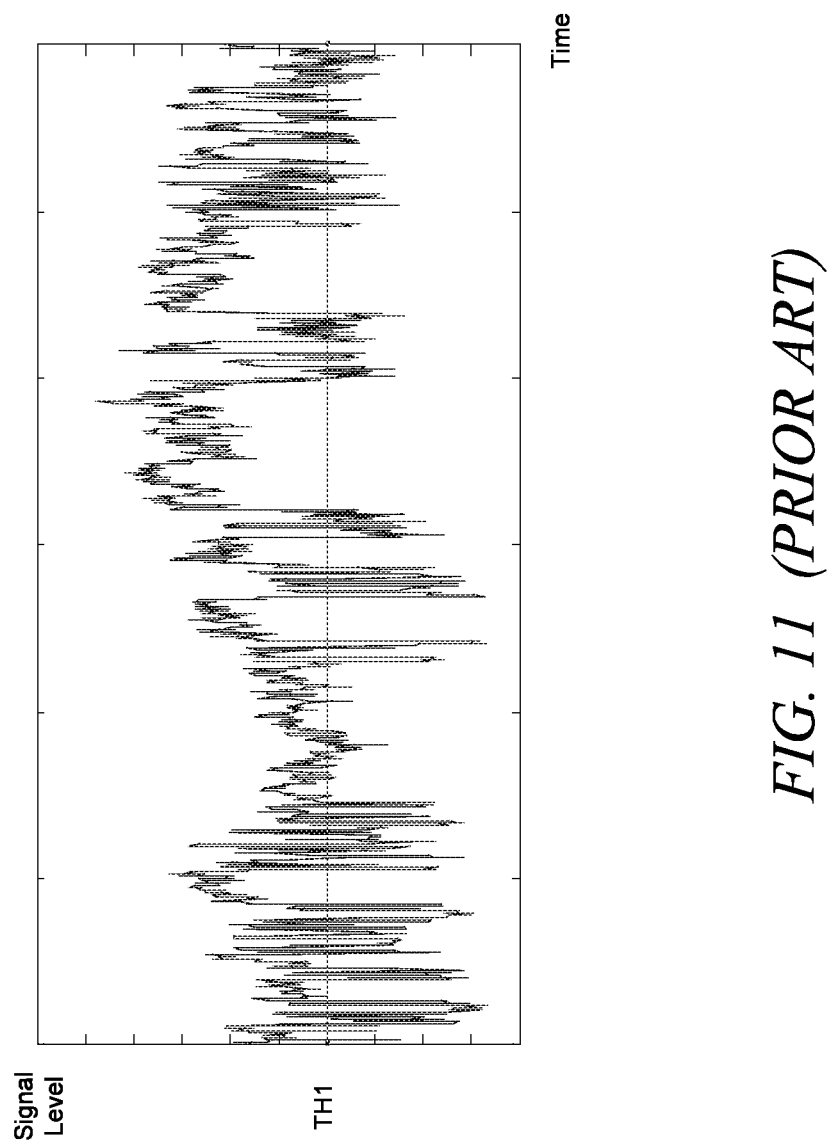
FIG. 11 is a graph for describing a problem in determining a threshold for an RTS containing noise according to the conventional art.

The above-mentioned selection rule for the pairs of the peaks is also effective to a case in which, as illustrated in FIG. 9B, the higher peak and the lower peak in a pair are located next to each other, and two types of pairs are distributed apart from each other. With regard to the above-mentioned selection rule of 1), a pair of peaks indicated by R is selected, whereas with regard to the above-mentioned selection rule of 2), a pair of peaks indicated by S is selected. Then, by obtaining the coefficients τ, the analysis of the RTS can be performed efficiently.

Further, in a case where there are three peaks as illustrated in FIG. 9C, based on the height of each peak, first, it is judged that the peak at the center is a result of combining a lower peak which makes a pair with the higher peak at the left end and a higher peak which makes a pair with the lower peak at the right end. Subsequently, based on this, in a similar fashion as in FIG. 9A or FIG. 9B described above, the analysis of the RTS can be performed efficiently by obtaining the coefficients τ with respect to the pairs indicated by T and U. In other words, in the case of the RTS in which the signal data has ternary state levels, when a combination of binary states is selected based on the above-mentioned calculation result of the histogram, a peak which is a result of combining a higher peak and a lower peak is identified based on the height of the peak of each state level, and this peak is divided into the higher peak and the lower peak. Then, the binary states of any one of a pair of the higher peaks and a pair of the lower peaks are selected. Next, a distance between each of the higher peaks and each of the lower peaks is calculated, whereby two pairs of the higher peak and the lower peak which have a common distance are identified. Then, the coefficients τ are obtained in such a manner as to allow the binary states of the peaks in any one of the pairs to be selected.

Here, in the above-mentioned description, in the case of one defect, it is assumed that the higher peak and the lower peak make a pair. However, in a case where only peaks having the same height appear, by changing a bias condition for a device, such as gate voltage, for observation, the peaks appear with different heights. Thus, by referring to the observation result thereof, a pair of different heights can be identified, therefore enabling the analysis.

Even in a case where the number of peaks of a histogram is other than that of the above-mentioned cases, similarly to the above-mentioned description, the focus is directed toward the heights of peaks and the distance between the distributions of peaks in a pair. Then, by repeating selection of a pair of peaks which needs to be processed and determination of the coefficients τ, the processing can be performed.

In the above-mentioned description, the embodiments according to the present invention have been described, and based on the idea of the embodiments of the present invention, various modifications and changes can be made. For example, depending on signal data, even if noise is overlapped to some extent and a part relating to the BPF processing from Steps 102 to 106 of FIG. 1 is omitted, it may be possible to perform the RTS analysis with the rest of the steps. This is because the threshold determination processing of the first embodiment of the present invention is effective. Further, for example, in Step 202 of FIG. 2, the average of the central values of the two state levels across all the sections is used as the initial value of the threshold. However, in a case of signal data having a large waving amount, an average of a leading portion in the first section (for example, 100 points from head) may be used as the initial value of the threshold to optimize the initial value of the threshold.

The invention claimed is:

1. A method for analyzing a random telegraph signal, comprising:
   employing a filter to perform band-pass filter processing with respect to signal data to remove low-frequency noise and high-frequency noise in advance;
   calculating a histogram of the filtered signal data;
   performing threshold determination processing based on the histogram of the filtered signal data;
   performing, based on a result of the threshold determination, binarization processing with respect to the filtered signal data; and
   obtaining, based on a result of the binarization, coefficients $\tau$.

2. A method for analyzing a random telegraph signal according to claim 1, comprising calculating, prior to the step of the band-pass filter processing, a frequency spectrum of the signal data.

3. A method for analyzing a random telegraph signal according to claim 2, wherein the step of the band-pass filter processing comprises allowing a signal within a frequency range which includes a frequency at an inflection point of the frequency spectrum of the signal data to pass.

4. A method for analyzing a random telegraph signal (RTS) according to claim 1, wherein the step of the threshold determination processing comprises obtaining, based on a result of the calculating the histogram, central values of respective levels of two states of the RTS and effective ranges for the respective levels indicating the two states.

5. A method for analyzing a random telegraph signal according to claim 4, wherein the step of the threshold determination processing further comprises obtaining, based on the result of the calculating the histogram an average of the central values of the two states.

6. A method for analyzing a random telegraph signal according to claim 1, wherein the step of the threshold determination processing comprises dividing the signal data into a plurality of sections and determining a threshold for each of the plurality of sections.

7. A method for analyzing a random telegraph signal according to claim 6, wherein the step of the threshold determination processing comprises, for the determining the threshold for each of the plurality of sections, a step of adjusting a section length of each section.

8. A method for analyzing a random telegraph signal according to claim 4, wherein the step of the threshold determination processing comprises dividing the signal data into a plurality of sections and determining each threshold for each of the plurality of sections.

9. A method for analyzing a random telegraph signal (RTS) according to claim 8, wherein the step of the threshold determination processing comprises calculating an effective ratio which indicates how much signal data of a section having a given section length is included in the effective ranges of the two states of the RTS to thereby perform the threshold determination by shortening the section length when the effective ratio is below a predetermined range, and by extending the section length when the effective ratio is above the predetermined range.

10. A method for analyzing a random telegraph signal according to claim 1, wherein the step of obtaining the coefficients $\tau$ comprises obtaining, based on a result of the binarization processing, the coefficients $\tau$ by applying a maximum likelihood method to distributions of pulse widths for respective levels.

11. A threshold determination method for a random telegraph signal, comprising:
    calculating a histogram with respect to data;
    performing threshold determination processing based on the histogram of the data; and
    performing, based on a result of the threshold determination, binarization processing with respect to the data,
    wherein the calculating, the threshold determination processing and the binarization processing are performed using a processor.

12. A threshold determination method for a random telegraph signal according to claim 11, wherein the step of the threshold determination processing comprises dividing the data into a plurality of sections and determining a threshold for each of the plurality of sections.

13. A threshold determination method for a random telegraph signal according to claim 12, wherein the step of the threshold determination processing comprises, for the determining the threshold for each of the plurality of sections, a step of adjusting a section length of each section.

14. A threshold determination method for a random telegraph signal (RTS) according to claim 12, wherein the step of the threshold determination processing comprises obtaining effective ranges of levels indicating two states of the RTS based on a result of the calculating the histogram to calculate an effective ratio which indicates how much signal data is included in the effective ranges for each of the plurality of sections, and performing the threshold determination by shortening a section length of the each of the plurality of sections when the effective ratio is below a predetermined range, and by extending the section length when the effective ratio is above the predetermined range.

15. A method for analyzing a random telegraph signal, comprising:
    calculating a moving average of signal data;
    performing, with a result of the calculating as a threshold, binarization processing with respect to the signal data and
    obtaining coefficients $\tau$ based on gradients of state levels of the signal data determined as a result of the binarization processing,
    wherein the calculating, the binarization processing and the obtaining coefficients $\tau$ are performed using a processor.

16. A method for analyzing a random telegraph signal (RTS), comprising:
    employing a high-pass filter to perform differentiation processing with respect to signal data;
    calculating a histogram of a result of the differentiation;
    performing, based on a result of the calculating the histogram, ternarization processing with respect to the result of the differentiation by focusing on a distribution of differential values, which indicates characteristics of jumps between state levels of the RTS;

performing integration processing with respect to a result of the ternarization processing to obtain binarized data in terms of actual time; and obtaining coefficients τ based on the binarized data obtained by the integration processing.

17. A method for analyzing a random telegraph signal according to claim 16, wherein:

the step of the ternarization processing comprises assigning "1" and "−1" to differential values indicating jumps upward and jumps downward of the RTS, respectively, and assigning "0" to differential values indicating other variation amounts; and the ternarization processing further comprises processing "1" that comes after "1" and "−1" that comes after "−1" as "0".

18. A method for analyzing a random telegraph signal (RTS) comprising:

employing a filter to perform band-pass filter processing with respect to signal data to remove low-frequency noise and high-frequency noise in advance;

calculating a histogram of the filtered signal data;

judging, based on a result of the calculating the histogram, whether or not the signal data comprises an RTS which contains state levels of ternary states or higher; and repeating, when the signal data comprises the RTS which contains the state levels of ternary states or higher:

selecting, based on the result of the calculating the histogram, a combination of binary states;

performing threshold determination processing with respect to the filtered signal data by focusing on the selected binary states;

performing binarization processing with respect to the filtered signal data; and obtaining coefficients τ.

19. A method for analyzing a random telegraph signal according to claim 18, wherein, when the signal data comprises an RTS which contains quaternary state levels, the step of obtaining the coefficients τ comprises:

selecting, upon selecting the combination of binary states based on the result of the calculating the histogram, binary states of any one of a pair of higher peaks and a pair of lower peaks;

subsequently calculating a distance between each of the higher peaks and each of the lower peaks;

identifying two pairs of the higher peak and the lower peak, which have a common distance on X axis; and selecting binary states of any one of the pairs of peaks.

20. A method for analyzing a random telegraph signal according to claim 18, wherein, when the signal data comprises an RTS which contains ternary state levels, the step of obtaining the coefficients τ comprises:

identifying, upon selecting the combination of binary states based on the result of the calculating the histogram, a peak which is a result of combining a higher peak and a lower peak based on a peak height of each state level to thereby divide that peak into the higher peak and the lower peak;

subsequently selecting binary states of any one of a pair of higher peaks and a pair of lower peaks;

subsequently calculating a distance between each of the higher peaks and each of the lower peaks;

identifying two pairs of the higher peak and the lower peak, which have a common distance; and selecting binary states of any one of the pairs of peaks.

* * * * *

UNITED STATES PATENT AND TRADEMARK OFFICE
CERTIFICATE OF CORRECTION

PATENT NO.       : 8,615,034 B2
APPLICATION NO.  : 12/512025
DATED            : December 24, 2013
INVENTOR(S)      : Takashi Kitagaki It is certified that error appears in the above-identified patent and that said Letters Patent is hereby corrected as shown below:

In the Claims:

In column 11, line 47, in claim 5, delete "histogram" and insert -- histogram, --, therefor.

In column 12, lines 50-51, in claim 15, delete "data and" and insert -- data; and --, therefor.

Signed and Sealed this
Twenty-second Day of April, 2014

Michelle K. Lee
*Deputy Director of the United States Patent and Trademark Office*